Figure 1:
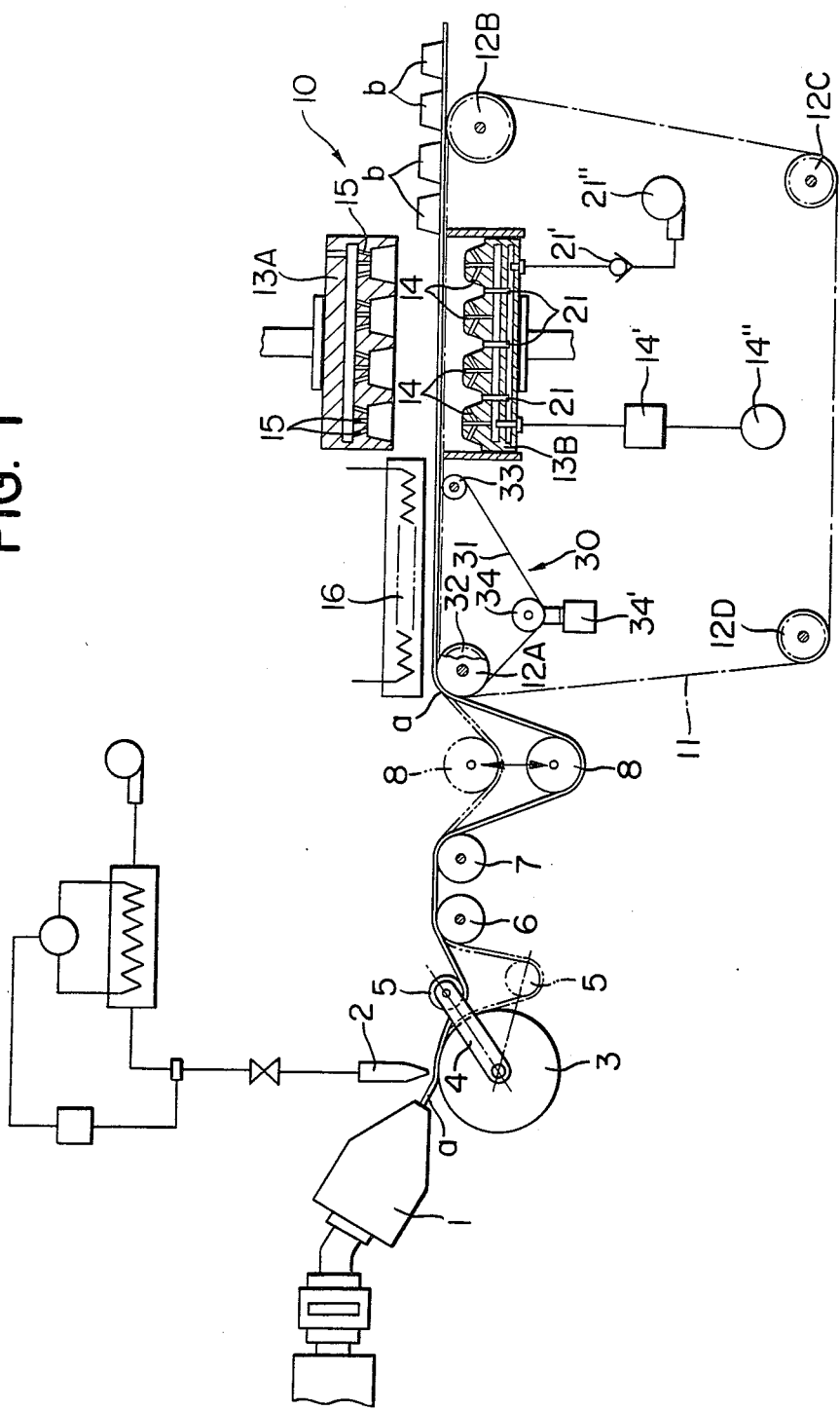

United States Patent [19]

Asano

[11] 4,368,024

[45] Jan. 11, 1983

[54] FORMING MACHINES

[75] Inventor: Kazuo Asano, Nagoya, Japan

[73] Assignee: Kabushiki Kaisha Asano Kenkyusho, Nagoya, Japan

[21] Appl. No.: 314,157

[22] Filed: Oct. 23, 1981

[30] Foreign Application Priority Data

Oct. 31, 1980 [JP] Japan .............................. 55/153986

[51] Int. Cl.³ .............................................. A23G 3/00
[52] U.S. Cl. ..................................... 425/397; 425/388
[58] Field of Search ......................... 425/388, 397, 395

[56] References Cited

U.S. PATENT DOCUMENTS

| | | | |
|---|---|---|---|
| 3,561,057 | 2/1971 | Butzko | 425/397 X |
| 3,632,273 | 1/1972 | Savickos | 425/397 X |
| 3,647,335 | 3/1972 | Brown | 425/395 X |
| 3,867,088 | 2/1975 | Brown et al. | 425/388 X |
| 3,914,103 | 10/1975 | Dean et al. | 425/397 |
| 4,043,736 | 8/1977 | Andres et al. | 425/397 |

*Primary Examiner*—J. Howard Flint, Jr.
*Attorney, Agent, or Firm*—Jordan and Hamburg

[57] ABSTRACT

Improvement for forming machine by preventing the softened thermoplastic material sheet from dangling and unevenly stretching between a pair of clamp chains, which are extended on a plurality of sprocket wheels to be intermittently driven so that the upper run thereof may receive and keep the sheet stationary in the waiting zone of the machine when the male and female die boxes are contacted for molding and then feeding the sheet between the separated die boxes. The improvement comprises a plurality of longitudinally elongated supporter means such as endless strings or a series of small discs arranged longitudinally close with each other in said waiting zone, and a plurality of bores formed in the lower die box for blowing air in the molding zone.

4 Claims, 5 Drawing Figures

FORMING MACHINES

The present invention relates to a forming machine comprising male and female die boxes adapted to be vertically movable between the first position where said die boxes are separated with each other so that a continuous sheet or a length of web of thermoplastic material is fed therebetween and the second position where said die boxes are contacted with each other for molding articles such as discarding cups, and more particularly to an improvement of such machine for the purpose of preventing the softened sheet or web from dangling between the both edges thereof by means of clamps mounted on a pair of endless chains adapted to intermittently run along the both sides of said web or sheet in front of molding zone of the forming machine and unevenly stretching which may cause difficulty of molding operation or production of inferior articles.

In such forming machine, the elongated plastic web stored and consequently of the room temperature is heated or the continuous plastic sheet issued just from an extruder is cooled so as to be of suitable plasticity for molding. In either case, the softened material must be fed between the separated die boxes, which are then relatively moved toward each other to be closed for molding, and the sheet on which a plurality of articles such as cups are formed must be taken out of the now separated die boxes for trimming. Thus the plasticized sheet must be intermittently conveyed by the distance of at least two times the length of the die boxes by means of said clamp chains.

On the other hand, the plastic sheet is often so soft at the temperature suitable for molding depending on the sort of the material that the sheet dangles between the clamped edges and the thickness thereof is uneven.

An object of the invention is thus to provide improvement for preventing said faults of the forming machine.

Such object can be attained according to the invention by providing a plurality of longitudinally extended supporter means in front of the molding zone, each of which may be an endless string extended on a plurality of driving and guide pulleys or a series of pulleys arranged close respectively with each other in the longitudinal direction. The number of such strings or pulleys arranged in the transverse direction is to be in conformity with the number less by one than the number of the dies arranged in the transverse direction on the die box, since such string or thin pulley is to eat into the soft plastic sheet which will adversely affect on the formed articles more or less and consequently it must support the plastic sheet along the line between the two adjacent positions where the articles are to be formed. Naturally the thickness of said string or pulley is preferably as thick as possible in order to lessen said adverse influence, but must be thinner than the space between the adjacent two dies transversely arranged.

It goes without saying that said supporter means cannot be provided in the molding zone where the male and female die boxes are contacted for molding. The dangling and/or uneven thickness in the region of the molding zone may be prevented according to the invention by blowing air from the lower die box, generally male die box.

Figure 3:
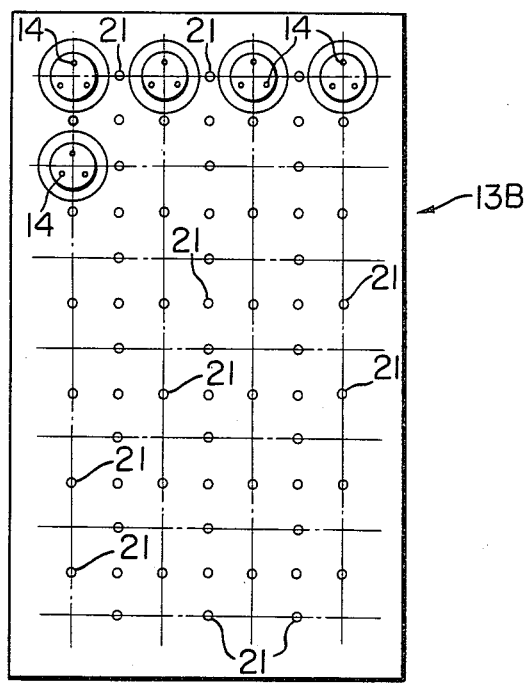
Figure 2:
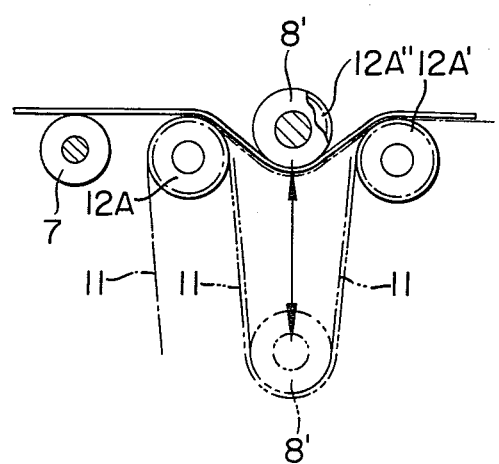
Figure 4:
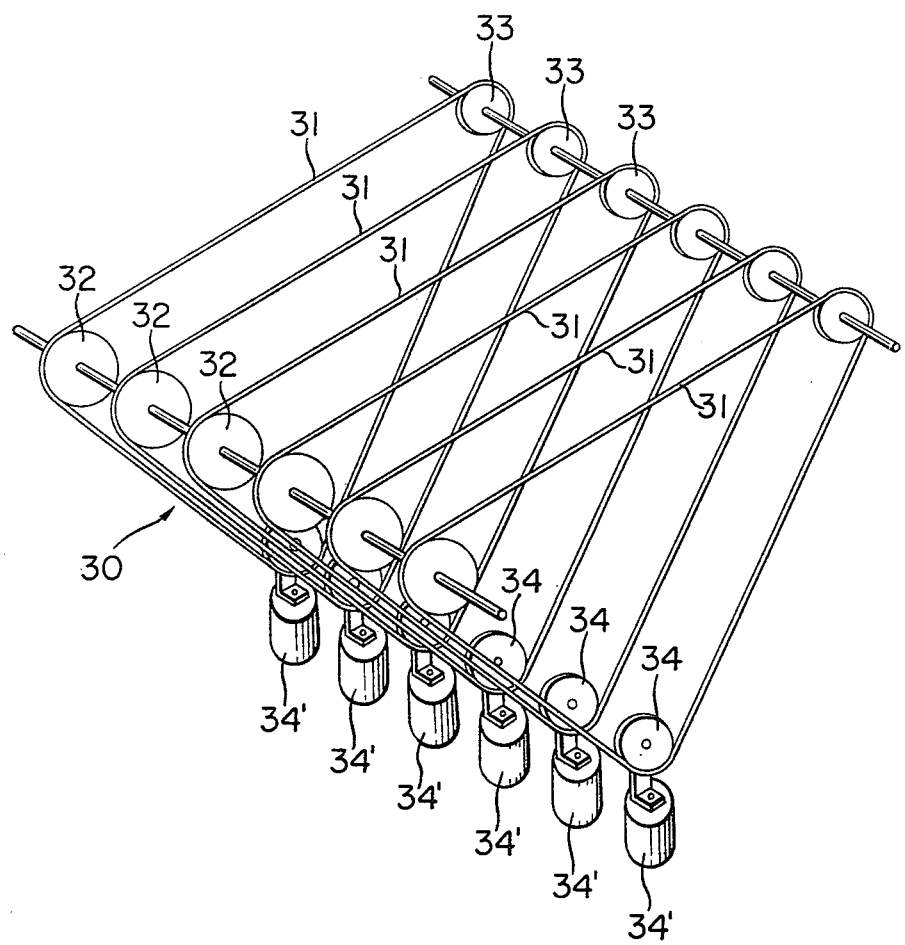
Figure 5:
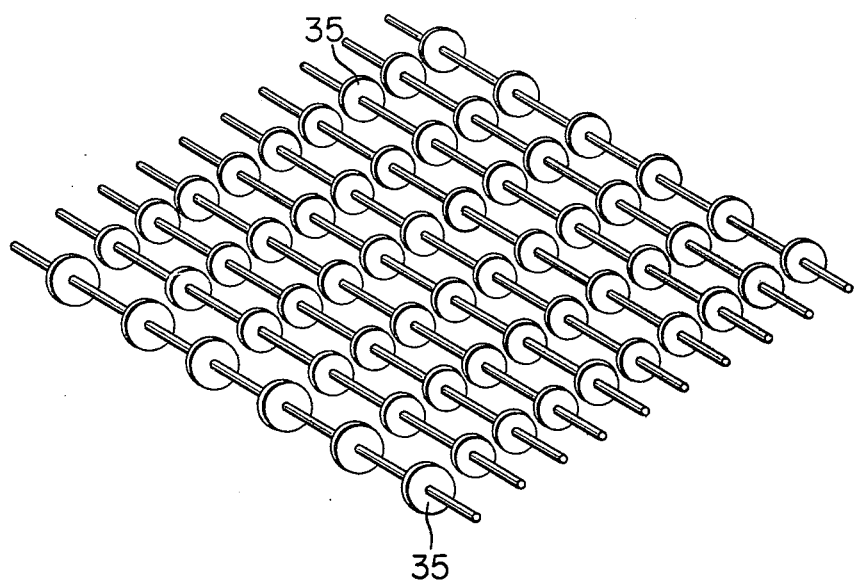

The invention shall be explained in more detail regarding a preferable embodiment combined with the extruder in reference to the accompanying drawings, in which;

FIG. 1 is a diagrammatic view showing the extruder and the forming machine improved according to the invention, FIG. 2 is a plan view of the lower die box, showing bores formed between every adjacent dies for blowing air for supporting the plastic sheet, in which only five dies are shown and the remainders not illustrated, FIG. 3 is a side view of an alternative of the dancing roll means, FIG. 4 is a perspective view of six endless strings, for supporting the plastic sheet each extended on three pulleies, and FIG. 5 is a perspective view of six series of pulleys, each series is of 10 pulleys arranged close with each other in the longitudinal direction for supporting the plastic sheet.

In reference to FIG. 1, a nozzle of the extruder is represented by 1, from which a thermoplastic material sheet $a$ is continuously issued. The sheet $a$ for instance of a temperature of 240° C. is cooled by means of air for instance of 150° C. blown from a nozzle 2 of the temperature control device and taken on a roll 3 of a surface temperature for instance of 70° C. which is preferably provided with a pair of arms 4 between which a roll 5 is mounted for free rotation on the plastic sheet $a$. Said arms 4 are angularly moved to the position shown by phantom lines so as to regulate the contact area of the sheet on the roll 3 and consequently the temperature of the sheet. The plastic sheet $a$ is further fed by means of conveyer rolls 6 and 7 toward the forming machine represented generally by 10. Just in front of the forming machine 10, the plastic sheet $a$ is passed over the lower surface of a dancing roll 8 which is adapted to be raised to the upper position shown by phantom lines so as to compensate the discordance caused by the continuous movement of the sheet issued from the extruder and the intermittent movement thereof in the range of the forming machine 10.

The sheet $a$ is then enters the region of forming machine 10, where a pair of endless clamp chains 11 are extended each on sprocket wheels 12A, 12B, 12C and 12D so as to be intermittently moved at a higher velocity for instance by means of the sprocket wheel 12B driven by a motor not shown. Many clamps (not shown) provided along the respective endless chain 11 hold the plastic sheet $a$ along the opposite edges thereof to feed it intermittently toward the molding zone where the male and female die assembly is provided and take the sheet on which articles $b$ are formed out of said molding zone.

In the illustrated embodiment, a lower die box 13B is made stationary and provided with four male dies or plugs arranged in the longitudinal direction, while an upper die box 13A is made movable down from the illustrated position toward the lower die box 13B for molding and correspondingly provided with four female dies arranged in the longitudinal direction. The plugs of the lower die box 13B is formed with bores 14 connected through a valve 14' to a blower 14", and the female dies of the upper die box 13A is formed with bores 15 connected to a vacuum source not shown, for producing differential pressure necessary for desired molding.

There may be provided a heater means 16 above the entrance zone of the upper run of the endless clamp chains between which the plastic sheet is held in order to heat the plastic sheet as occasion demands to be of optimum plasticity for molding. When the forming machine 10 is not combined with the extruder, the thermoplastic web of the room temperature is heated on said entrance zone to be soften. The length of said zone is to correspond to the length of the die box 13A, 13B so that when the die boxes 13A and 13B are closed for molding operation the plastic sheet of the corresponding length is waiting there, during which the corresponding length of the plastic sheet may be stored by lowering of the dancing roll 8 despite of successive extrusion of the plastic sheet from the nozzle 1 at a constant and lower velocity, and when the die boxes 13A and 13B are separated said length of the plastic sheet in the waiting zone is transferred to the molding zone.

Although it is not the object of the invention, an alternative of said dancing roll is illustrated in FIG. 2, according to which there is provided a sprocket wheel 12A' in addition to said sprocket wheel 12A between which another sprocket wheel 12A" is arranged so as to be vertically moved between the upper position illustrated in solid lines and the lower position illustrated in phantom lines with engaging to said chains 11. Between a pair of said sprocket wheels 12A" a dancing roll 8' is mounted.

Now in reference to FIG. 3, means for preventing the softened plastic sheet from dangling and unevenly stretching in the molding zone of the forming machine according to the invention shall be explained. It is noted that the plastic sheet a is fed to and above the lower die box 13B from the left to the right in FIG. 3 in conformity with FIG. 1. Said die box is provided with four male dies or plugs in the feeding or longitudinal direction as referred to above, and seven plugs traversely thereto according to the example illustrated in FIG. 3. Thus there are to be provided totally twenty-eight plugs, but five plugs only are actually shown therein for the sake of simplicity of the drawing.

In every plug there are formed three bores 14 for producing differential pressure as referred to above. In order to blow air for uniformly supporting the plastic sheet above the die box 13B and consequently for preventing the plasticized sheet from dangling and unevenly stretching between the opposite edges clamped, there are formed bores 21 in the die box 13B between every adjacent plugs, of which number is to be totally sixty-three in the illustrated embodiment, although such numbers of the plugs and bores are of course not critical. As seen in FIG. 1, the bores 21 are connected through a valve 21' to a blower 21" or any other pneumatic source. The pressure of air to be blown and the like is to be varied depending on the conditions such as plasticity of the sheet.

Means for supporting the plastic sheet in the waiting zone of the forming machine 10, which is represented generally by 30 in FIG. 1, shall be explained in reference to FIG. 4. Said means 30 comprises a plurality of endless strings 31 each of which is extended in the sheet feeding direction between pulleys 32 and 33, and on a third pulley 34 provided with a weight 34' for keeping the endless string 31 in a suitable tension. The number of and the space between the adjacent two of the strings 31 and consequently of pulleys 32, 33, 34 is to be six so that the corresponding number of longitudinal lines striated along the plastic sheet by said strings may be brought between the every adjacent two of the seven plugs and female dies in the longitudinal direction.

The pulleys 32 are preferably mounted on a shaft on which a pair of the sprocket wheels 12A are mounted so that the strings 31 may be moved together with the plastic sheet a to be moved by a pair of the clamp chains 11 each engaged with said sprocket wheels 12A. The pulleys 33 are arranged just in front of the molding zone so that the upper run of each endless string 31 may support the plastic sheet along the substantial length of the waiting zone.

An alternative of said means for supporting the sheet is shown in FIG. 5. This alternative comprises a series of six small discs 35 mounted on a shaft arranged in the sheet feeding direction so that the longitudinally aligned discs 35 may serve to support the sheet like as a string in the embodiment referred to above. Thus the space between the adjacent two discs in the longitudinal direction is preferably as close as possible. Every shaft having six discs fixedly mounted thereon may be journalled for free rotation or for intermittent rotation in timing with the plastic sheet movement.

What is claimed is:

1. In a forming machine comprising a molding zone where upper and lower die boxes are arranged so as to be relatively movable between the separated position for receiving softened thermoplastic material sheet therebetween and the closed position for molding, a waiting zone where the plastic sheet of the length substantially corresponding to the longitudinal dimension of the die box is waiting when the die boxes are closed so as to be fed to the molding zone when the die boxes are separated, and a pair of endless chains each provided with a plurality clamps therealong so as to grasp said plastic sheet along the opposite edges thereof for intermittently feeding from said waiting zone to said molding zone and taking the plastic sheet on which articles are formed out of said molding zone for trimming, an improvement comprising a plurality of longitudinally extended supporter means so as to support the plastic sheet in the waiting zone, the number of which is less by one than the number of dies arranged transversely in the die box so that each of the longitudinal lines striated by said supporter means in the plastic sheet along the reverse side thereof may pass between the adjacent two dies in the molding zone.

2. The improvement as set forth in claim 1, in which said supporter means is an endless string extended on a plurality of pulleys so that the upper run thereof may support the plastic sheet.

3. The improvement as set forth in claim 1, in which said supporter means is a series of small discs respectively for rotation and arranged in alignment in the longitudinal direction and as close as possible with each other.

4. The improvement as set forth in claim 1, in which there are provided a plurality of bores uniformely in the lower die box for blowing air upward so that the plastic sheet is held substantially horizontally between the opposite edges grasped by said clamps on the endless chains during the movement thereof from the waiting zone to the molding zone in the molding zone.

* * * * *